(12) United States Patent
Handa

(10) Patent No.: US 9,380,131 B2
(45) Date of Patent: Jun. 28, 2016

(54) COMMUNICATION APPARATUS, COMMUNICATION METHOD AND PROGRAM

(75) Inventor: Masahiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 751 days.

(21) Appl. No.: 12/846,550

(22) Filed: Jul. 29, 2010

(65) Prior Publication Data

US 2011/0029679 A1 Feb. 3, 2011

(30) Foreign Application Priority Data

Jul. 31, 2009 (JP) ................................. 2009-179811

(51) Int. Cl.
*H04L 29/06* (2006.01)
*H04L 29/14* (2006.01)

(52) U.S. Cl.
CPC ............ *H04L 69/04* (2013.01); *H04L 63/0272* (2013.01); *H04L 65/1006* (2013.01); *H04L 69/40* (2013.01)

(58) Field of Classification Search
None
See application file for complete search history.

(56) References Cited

U.S. PATENT DOCUMENTS

| 2005/0010925 A1* | 1/2005 | Khawand et al. ............. 719/310 |
| 2006/0010486 A1* | 1/2006 | Lu et al. ............................ 726/4 |
| 2007/0103715 A1 | 5/2007 | Nakata |

FOREIGN PATENT DOCUMENTS

| JP | 2002-082907 A | 3/2002 |
| JP | 2007-128359 A | 5/2007 |
| JP | 2008-083897 A | 4/2008 |
| JP | 2008-299617 A | 12/2008 |

* cited by examiner

*Primary Examiner* — Scott B Christensen
(74) *Attorney, Agent, or Firm* — Canon USA Inc. IP Division

(57) ABSTRACT

A communication apparatus receives a communication request from a communication partner and determines whether itself functions as a server or a client. If a first parameter for communication for causing the communication partner to function as the client is included in the communication request and the communication apparatus functions as the server, the communication apparatus determines a second parameter for communication for causing the communication apparatus to function as the server based on the first communication parameter. If the communication apparatus offers the communication partner to function as the client in response to the communication request, the communication apparatus determines a third parameter for communication for causing the communication apparatus to function as the client. The communication apparatus transmits data indicating whether the communication apparatus functions as the server or the client, and the second or the third parameter for communication with the communication partner.

12 Claims, 14 Drawing Sheets

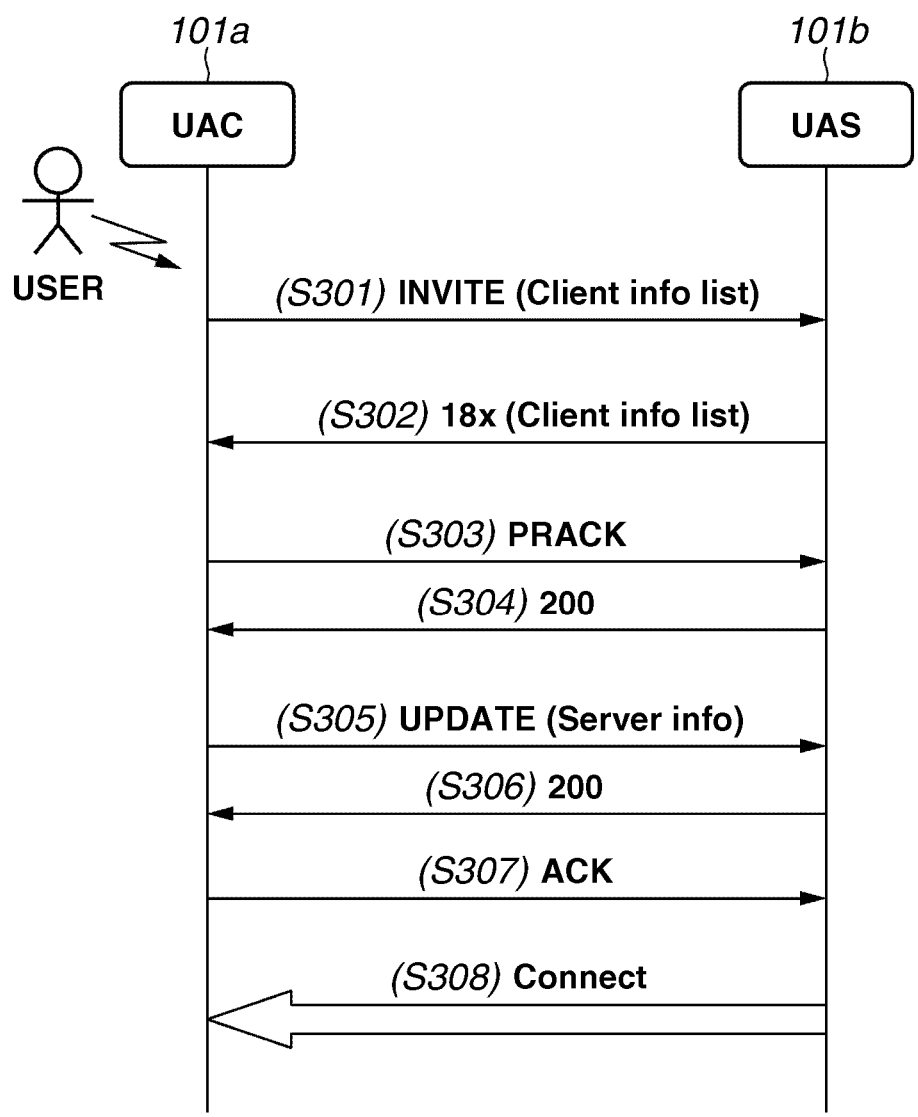

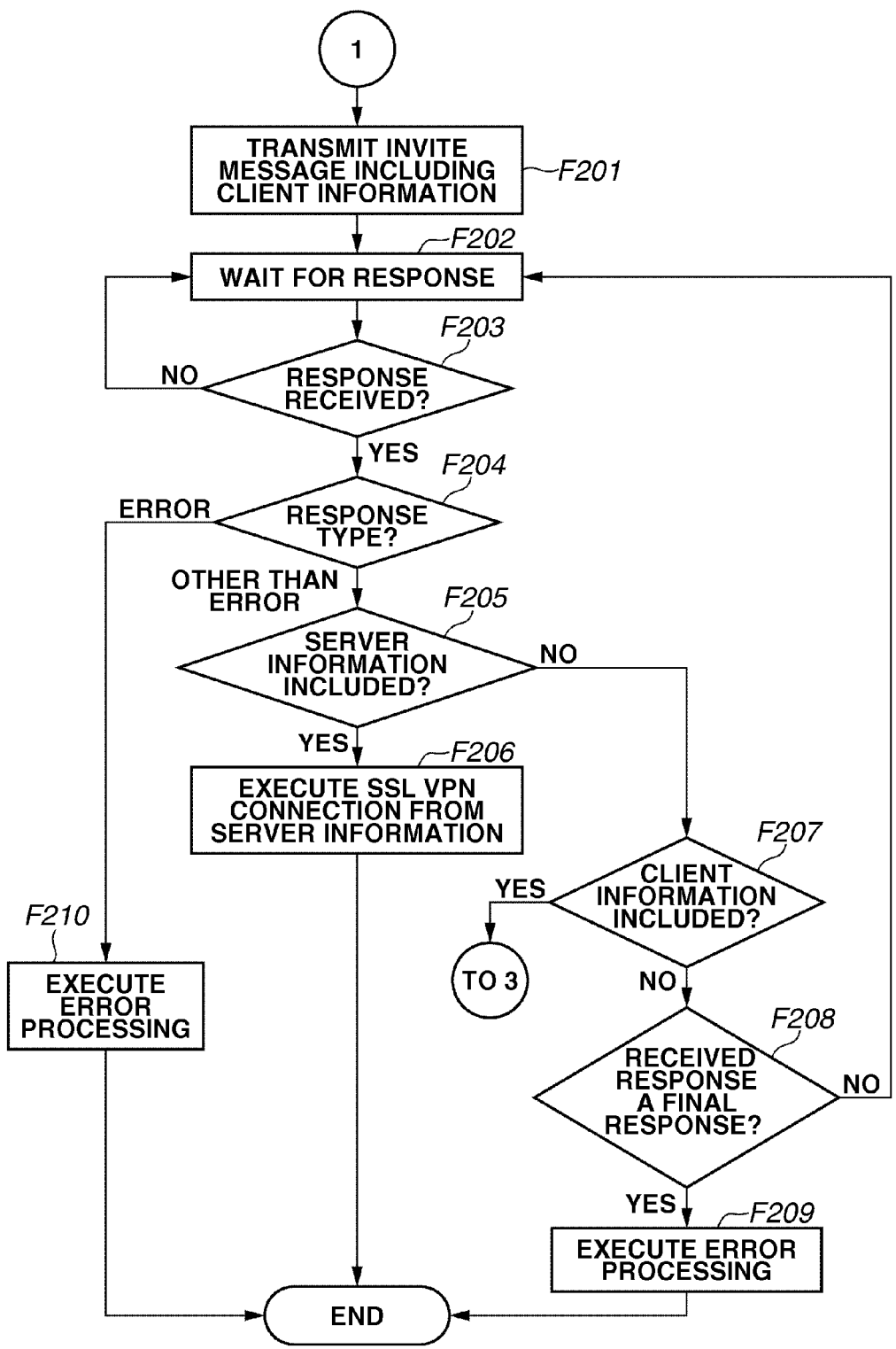

FIG.10A

```
v=0
O=alice 123 123 IN IP4 10.0.0.1
s=-                 400
                              410
c=IN IP4 10.0.0.1 m=ssl-vpn 12345 TCP
       411        412
a=encryption: AES-128-ZLIB
              413
a=setup:active a=connection:new m=ssl-vpn 23456 TCP                420
       421        422
a=encryption: DES-256-ZLIB
              423
a=setup:active a=connection:new
 .
 .
```

FIG.10B

```
v=0
O=alice 123 123 IN IP4 10.0.0.1
s=-         500 c=IN IP4 10.0.0.1
               501
m=ssl-vpn 11111 TCP
               502
a=setup:passive
                503
a=encryption: AES-128-ZLIB a=connection:new
 .
 .
```

FIG.11A

|  | CLIENT | | SERVER | | |
| --- | --- | --- | --- | --- | --- |
|  | ENCRYPTION | COMPRESSION | ENCRYPTION | PORT NUMBER | COMPRESSION |
| UAC | AES-128 DES-256 | ZLIB | DES-256 | 33333 | NON-COMPATIBLE |
| UAS | AES-128 DES-256 | NON-COMPATIBLE | AES-128 | 11111 | ZLIB |
|  |  |  | DES-128 | 22222 |  |

FIG.11B

|  | CLIENT | | SERVER | | |
| --- | --- | --- | --- | --- | --- |
|  | ENCRYPTION | COMPRESSION | ENCRYPTION | PORT NUMBER | COMPRESSION |
| UAC | NON-COMPATIBLE | NON-COMPATIBLE | DES-256 | 33333 | ZLIB |
| UAS | AES-128 DES-256 | NON-COMPATIBLE | AES-128 | 11111 | NON-COMPATIBLE |
|  |  |  | DES-128 | 22222 |  |

FIG.11C

|  | CLIENT | | SERVER | | |
| --- | --- | --- | --- | --- | --- |
|  | ENCRYPTION | COMPRESSION | ENCRYPTION | PORT NUMBER | COMPRESSION |
| UAC | DES-256 | NON-COMPATIBLE | DES-256 | 33333 | ZLIB |
| UAS | AES-128 DES-256 | NON-COMPATIBLE | AES-128 | 11111 | NON-COMPATIBLE |
|  |  |  | DES-128 | 22222 |  |

COMMUNICATION APPARATUS, COMMUNICATION METHOD AND PROGRAM

BACKGROUND OF THE INVENTION

1. Field of the Invention

The present invention relates to a communication apparatus and a method thereof.

2. Description of the Related Art

In recent years, a technology for realizing data communications over an Internet Protocol (IP) network, based on a virtual communication path (session) established between communication apparatuses has been widely used (e.g., Japanese Patent Application Laid-Open No. 2007-110387).

As a session control protocol for controlling establishment, continuation, and disconnection of a session between communication apparatuses, there is used a protocol referred to as a Session Initiation Protocol (SIP), in the Request for Comments (RFC) 3261. As a method for negotiating various parameters of the data communication, when the communication apparatus starts data communication with a partner apparatus using the SIP, there is specified an Offer-Answer model or a model for determining a communication terminal that establishes connection of Transmission Control Protocol (TCP) when performing the data communication using the TCP.

The Offer-Answer model is a model in which a communication terminal that makes a start request of the data communication offers various parameters usable in the data communication, and a communication partner answers a parameter that the communication partner actually uses in the data communication from among the offered parameters (Refer to RFC3264"An Offer/Answer Model with SIP").

In the case where the TCP is used in the data communication, the communication terminal which makes start request of the data communication offers negotiation information including connection modes of "Active", "Passive", or "Actpass", for determination of a terminal which establishes connection of the TCP. Then, the partner communication apparatus determines a TCP connection terminal by selecting the connection mode of the TCP from among the offers (Refer to RFC4145 "TCP-Based Media Transport in the SIP").

However, in the conventional Offer-Answer model, when the communication apparatus offers various parameters of the data communication, the communication apparatus indicates all parameters which can be used in the data communication to the partner communication apparatus, and the partner communication apparatus selects the parameters to be used in the data communication from among them. Therefore, the communication apparatus which has offered the parameters encounters a problem that all the parameters such as capability and settings of itself may be eventually known by the partner communication apparatus.

As a specific example, a case where a connection setting of a Secure Socket Layer Virtual Private Network (SSL VPN) to be used in the data communication according to the Offer-Answer model is negotiated will be described. Since the SSL VPN is connected by the TCP, it is necessary for a client to connect to a server when connection is started. Further, it is necessary for both of the server and the client to negotiate on settings such as a type of encryption and presence/absence of compression. Moreover, the server needs to notify the client of an IP address and a port number for getting access to at least itself, as connection waiting information of the TCP.

To begin with, the communication apparatus offers all settings of the VPNs which are supported by itself. In the offered settings, the settings such as encryption types connectable as the client, information about encryption types connectable as the server, and the IP address and the port number for getting access to itself are included. The partner communication apparatus performs negotiation about the VPN to be used in the data communication by replying the settings to be actually used from among these.

What is a problem herein is to offer settings of the VPN which are not actually used to the partner communication apparatus. In particular, it is not desirable in terms of security that information of the server is known by the partner communication apparatus.

SUMMARY OF THE INVENTION

The present invention is directed to improving security of a communication apparatus.

According to an aspect of the present invention, a communication apparatus includes a reception unit configured to receive a communication request from a communication partner, a determination unit configured to determine whether the communication apparatus functions as a server or functions as a client based on a first parameter included in the communication request, and if a first parameter for communication for causing the communication partner to function as the client is included in the communication request and the communication apparatus functions as the server, determines a second parameter for communication for causing the communication apparatus to function as the server based on the first parameter for communication for causing the communication partner to function as the client, on the other hand, if the communication apparatus offers the communication partner to function as the client in response to the communication request, determine a third parameter for communication for causing the communication apparatus to function as the client, and a transmission unit configured to transmit data indicating whether the communication apparatus functions as the server or functions as the client, and the second or the third parameter for communication with the communication partner.

According to another aspect of the present invention, a transmission unit configured to transmit a communication request to a communication partner, a reception unit configured to receive a response in response to the communication request, and a control unit configured, when data indicating that the communication partner functions as a client is included in the response, to determine a second parameter for communication for causing the communication apparatus to function as a server based on a first parameter for communication for causing the communication partner to function as the client which is included in the response, and configured to control the transmission unit to transmit the second parameter to the communication partner.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates the data communication start procedures.

FIGS. 8A to 8C are flowcharts illustrating data communication start processing in case of data communication by the SSL VPN.

FIGS. 10A and 10B illustrate an example of a service delivery platform (SDP) including SSL VPN client information, and an example of an SDP including SSL VPN server information.

FIGS. 11A to 11C illustrate correspondence between a user agent client (UAC) and a user agent server (UAS), and the SSL VPN client information and the SSL VPN server information.

DESCRIPTION OF THE EMBODIMENTS

Various exemplary embodiments, features, and aspects of the invention will be described in detail below with reference to the drawings.

Figure 1:
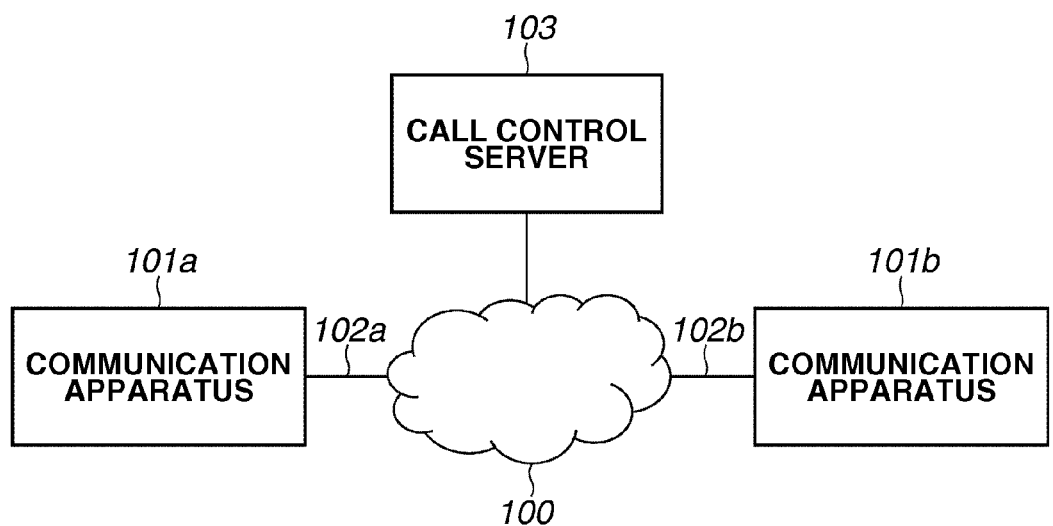
FIG. 1 illustrates a configuration of network system according to an exemplary embodiment of the present invention.

FIG. 1 illustrates a configuration of a network system according to an exemplary embodiment of the present invention. In FIG. 1, a communication network 100 includes such as the Internet or a public network. The network 100 may be a network such as a local area network (LAN).

Communication apparatuses 101a and 101b, such as a personal computer (PC), a server, a set-top box (STB), or a router, are connected to the network 100. The communication apparatus 101a and the communication apparatus 101b have a SIP-user agent (UA) function and a function of establishing a session between the communication apparatuses 101a and 101 by utilizing the SIP. Moreover, the communication apparatus 101a and the communication apparatus 101b have a function of establishing a secure socket layer virtual private network (hereinafter, SSL VPN) connection onto the session established using the SIP, and performing the data communication. In the present exemplary embodiment, the SSL VPN connection is established between the communication apparatuses 101a and 101b, but they may be connected using Transport Layer Security (TLS), Datagram Transport Layer Security (DTLS) or the like.

Access networks 102a and 102b connect the network 100 to the communication apparatuses 101a or 101b respectively. The access networks may be a wired connection, or a wireless connection.

A call control server 103 is located within the network 100, and provides various call control services, such as address resolution according to the SIP or transfer of messages.

Figure 2:
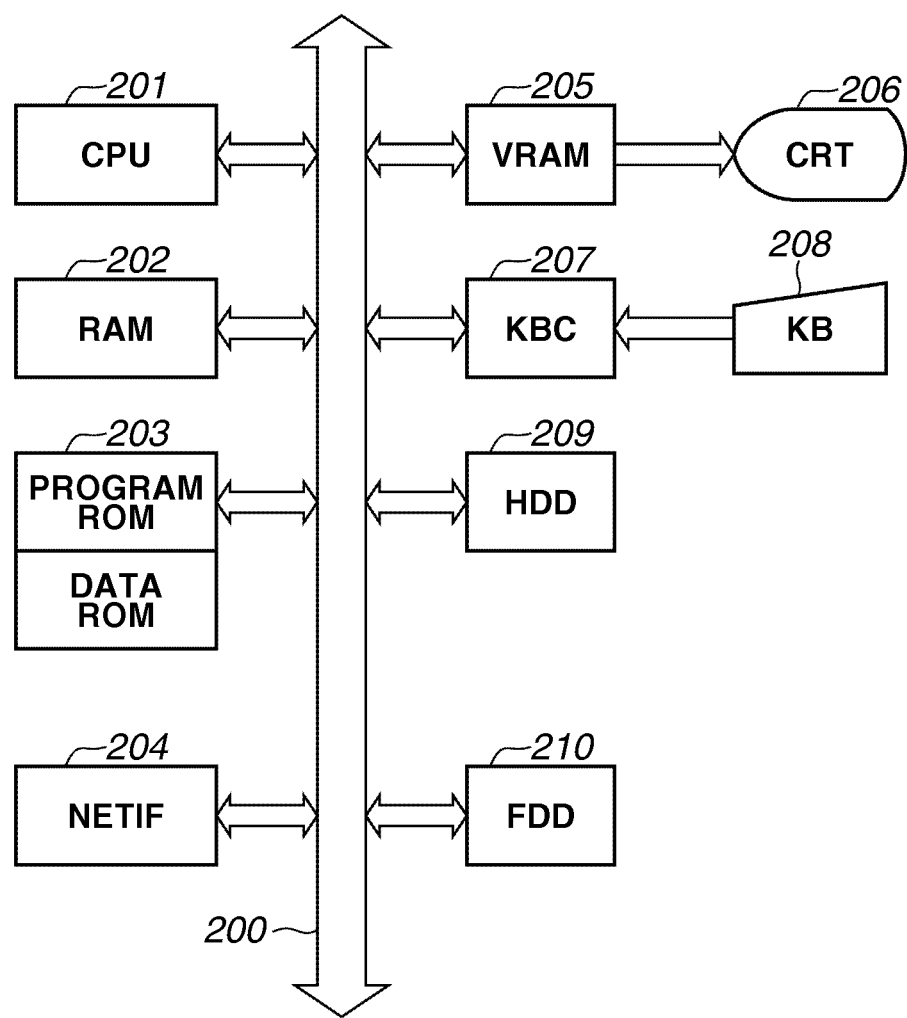
FIG. 2 illustrates a hardware configuration of a communication apparatus.

FIG. 2 illustrates a hardware configuration of the communication apparatuses 101a and 101b according to the present exemplary embodiment. Each of the communication apparatuses 101a and 101b is not limited to a computer system such as a personal computer (PC). More specifically, it is also possible to implement the functions of the exemplary embodiment by a workstation, a notebook PC, a palmtop PC, various types of household electrical appliances with a built-in computer, a game machine having a communication function, a cellular phone, a personal digital assistant (PDA), a remote controller, in addition to the computer system. Further, the communication apparatuses 101a and 101b can be integrally constituted by an apparatus that provides a data receiving service and a data supplying service.

A central processing unit (hereinafter, CPU) 201 controls the entire computer system. A random access memory (hereinafter, RAM) 202 functions as a main memory of the CPU 201, an area of an execution program, an execution area of the program, and a data area. A read-only memory (hereinafter, ROM) 203 records therein an operation processing procedure of the CPU 201. The ROM 203 includes a program ROM which has recorded a basic software (operating system (OS)) as a system program for controlling devices in the computer system and a data ROM in which necessary information and the like for running the system has been recorded. In place of the ROM 203, a hard disk drive (HDD) 209 described below may be used.

A network interface (hereinafter, NETIF) 204 performs control for transferring data between the computer systems and a diagnosis of a connection status via the network (e.g., the access network 102a or 102b). The NETIF 204 of the communication apparatus 101a transmits and receives signals to and from the communication apparatus 101b via the access network 102a and the network 100. The signals may be transmitted and received via the call control server 103. More specifically, the communication apparatus 101a transmits and receives signals, such as a connection request of the SIP, a final response, and a response confirmation, from the NETIF 204. For example, in the present exemplary embodiment, the communication apparatus 101a transmits and receives the signals to and from the communication apparatus 101b.

A video RAM (hereinafter, VRAM) 205 rasterizes an image to be displayed on a screen of a cathode ray tube (CRT) 206, which will be described below, for indicating an operation status of the computer system, and controls the display of the rasterized image. A display device 206 can be a display, for example. Hereinbelow, the display device is referred to as a CRT 206. A controller 207 controls an input signal from an external input device 208 which will be described below. The external input device 208, for example, a keyboard, receives an operation that a user of the computer system causes the computer system to execute.

A storage device 209 such as a hard disk is used to store application programs and data such as image information. Application programs according to the present exemplary embodiment are software programs for giving an instruction of service start during a session establishment procedure which constitute the present exemplary embodiment. An external input/output device 210 includes, for example, a compact disk (CD)-ROM drive which allows input and output to and from a removable storage medium. The external input/output device 210 is used to read the above described application programs from a storage medium. Hereinbelow, the external input/output device is referred to as a floppy disk drive (FDD). The application programs and data stored on the HDD 209 can be stored on the FDD 210 and executed. An input/output bus (an address bus, a data bus, or a control bus) 200 connects the above described units.

Figure 3:
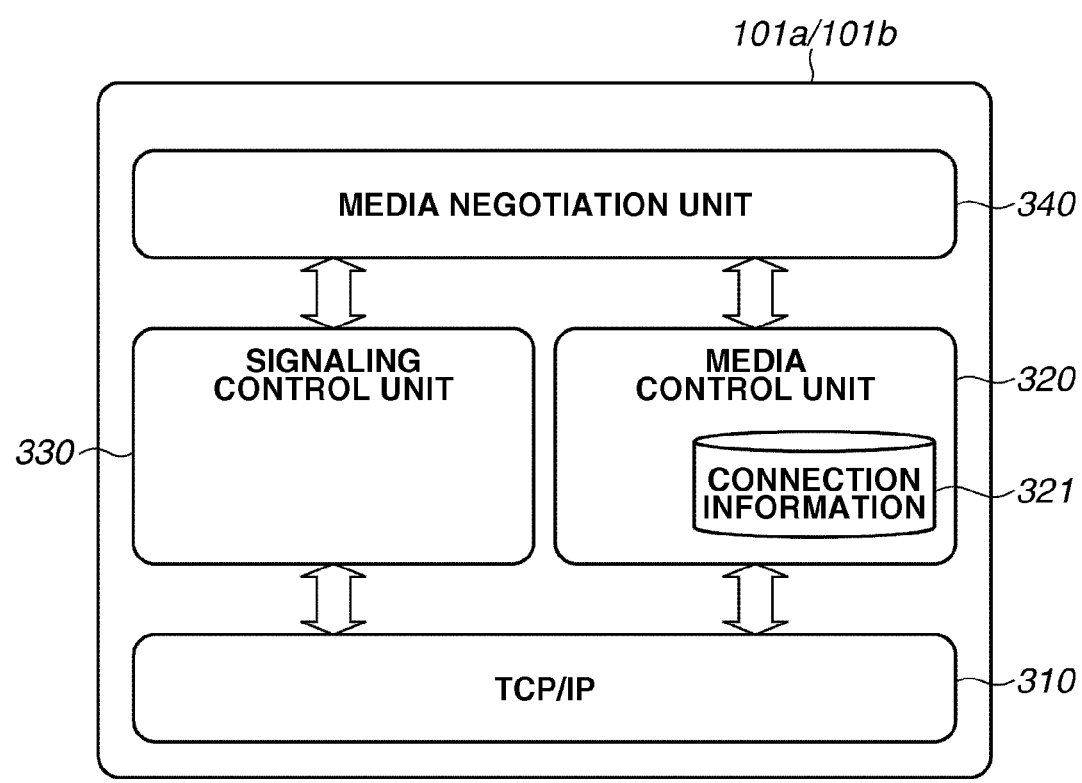
FIG. 3 illustrates a software configuration of a communication apparatus.

Next, a software configuration of the communication apparatuses 101a and 101b according to the present exemplary embodiment will be described below with reference to FIG. 3.

The software is stored on the HDD 209, for example, and read out to the RAM 202 and executed by the CPU 201 when needed.

A TCP/IP 310 is a module for transmitting messages to be exchanged by a media control unit 320 and a signaling control unit 330 using the TCP/IP protocol that is normally employed in the communication network.

The media control unit 320 is a module for performing data communication between the communication apparatuses 101a and 101b. In the present exemplary embodiment, the media control unit 320 performs connection and disconnection of the SSL VPN, and data transfer with the partner communication apparatus.

Connection information 321 includes encryption types (e.g., information of AES, DES, or the like) to be supported, as SSL VPN client information. The connection information 321 also includes, as the SSL VPN client information, information about a key length (e.g., information of 128 bit, 256 bit, or the like) for each encryption type, availability of data compression (e.g., ZLIB, LZO), and so forth. Further, the connection information 321 includes, as SSL VPN server information, information about encryption types (e.g., AES, DES), a key length (e.g., 128 bit, 256 bit) for each encryption type, availability of data compression (e.g., ZLIB, LZO) and so forth. Moreover, the connection information 321 includes IP addresses and port numbers, and so forth. AES is an abbreviation for Advanced Encryption Standard, and DES is for Data Encryption Standard. The connection information 321 is provided in the RAM 201.

The signaling control unit 330 is a module for transmitting and receiving control messages in accordance with specifications of the SIP for establishing a session between the communication apparatuses 101a and 101b.

When a session is established between the communication apparatuses 101a and 101b, a media negotiation unit 340 acquires and analyzes an SDP added to a SIP message from the partner. Further, the media negotiation unit 340 creates the SDP based on the SSL VPN server information acquired from the connection information 321 corresponding to the SSL VPN client information of the partner acquired from the SDP. Furthermore, the media negotiation unit 340 creates the SDP based on the SSL VPN client information acquired from the connection information 321.

Figure 4:
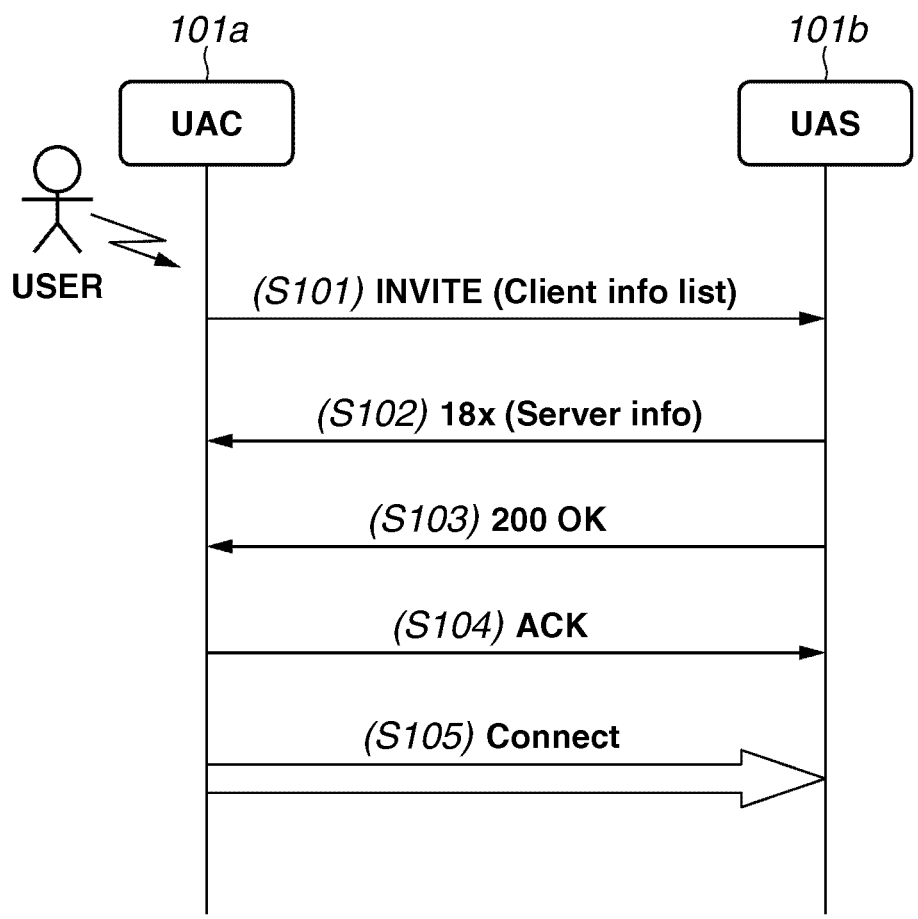
FIG. 4 illustrates data communication start procedures.
Figure 5:
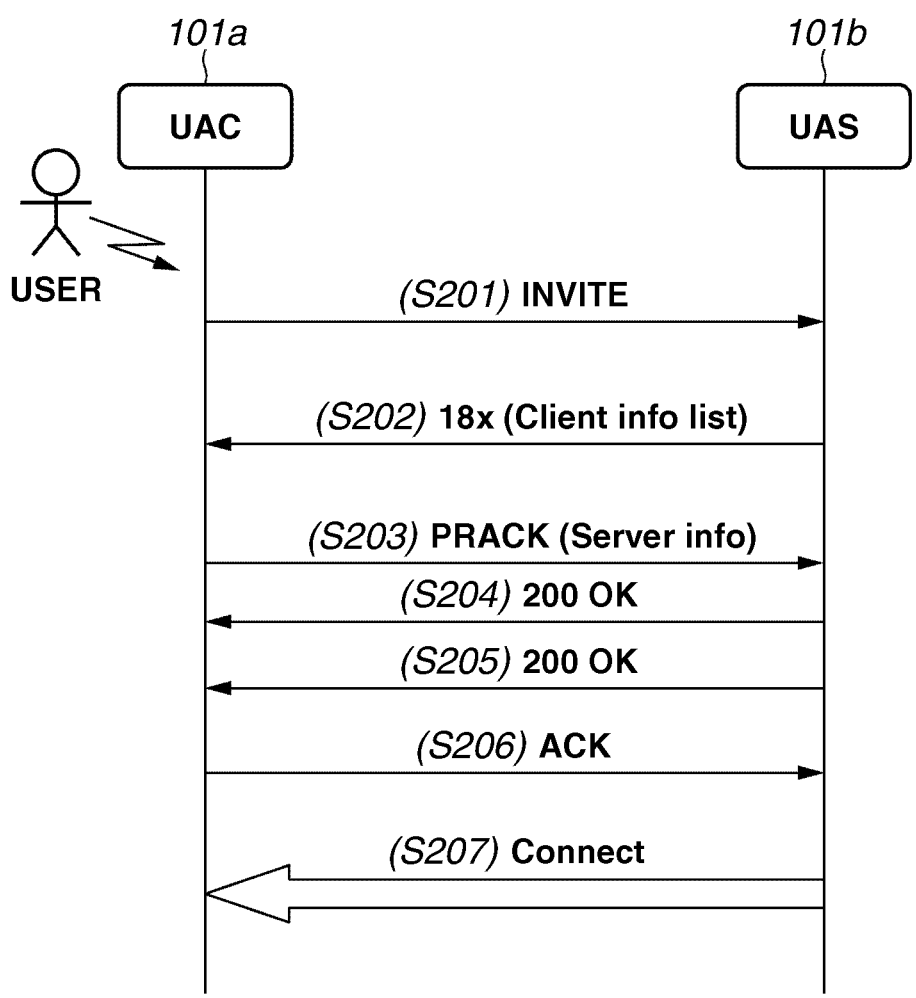
FIG. 5 illustrates the data communication start procedures.

Next, referring to FIG. 4 through FIG. 6, data communication start procedures according to the present exemplary embodiment will be described below with taking the data communication via the SSL VPN as an example. The data communication illustrated in FIG. 4 through FIG. 6 is executed in accordance with the session control protocol.

It is assumed that the communication apparatus 101a is an SIP user agent client (UAC), and the communication apparatus 101b is an SIP user agent server (UAS). The UAC (the communication apparatus 101a) makes a connection request to the UAS (the communication apparatus 101b) by a user inputting an SIP uniform resource identifier (SIP-URI) indicating the communication apparatus 101b. In FIG. 4, FIG. 5 and FIG. 6, the UAC and the UAS directly transmits and receives messages. However, the UAC and the UAS may perform SIP message or data communication which is relayed by a SIP server, a router, or other apparatuses located between the UAC and the UAS.

A case where the communication apparatus 101a which makes a connection request to the communication apparatus 101b becomes a client (client apparatus) of the SSL VPN will be described with reference to FIG. 4.

In step S101, the communication apparatus 101a transmits to the communication apparatus 101b an INVITE message which includes the SDP to which at least one or more pieces of the SSL VPN client information stored in the connection information 321 is added, according to a connection instruction from the user. Consequently, the SSL VPN connection is offered by the communication apparatus 101a. The SSL VPN client information includes types of the SSL VPN clients supported by the communication apparatus 101a.

The type of the SSL VPN client is a combination of various parameter settings of the data communication, such as encryption types or availability of data compression. For example a case illustrated in FIG. 11A, the type of the SSL VPN client is an SDP including "encryption type is AES, key length is 128 bit, data compression is enabled, client", and "encryption type is DES, key length is 256 bit, data compression is enabled, client". FIGS. 11A to 11C illustrate correspondence between the UAC and the UAS, and the SSL VPN client information and the SSL VPN server information, each storing in the connection information 321.

The communication apparatus 101b that has received the INVITE message, analyzes the SDP included in the INVITE message, and acquires the SSL VPN client information which the communication apparatus 101a has offered. Then, in step S102, the communication apparatus 101b selects the SSL VPN client information to be used in the data communication from among the offered SSL VPN client information, and transmits to the communication apparatus 101a a provisional response including the SDP added with corresponding SSL VPN server information. Consequently, the communication apparatus 101b makes a response to the SSL VPN connection. The communication apparatus 101b may transmit 200 response added with the SDP. The 200 response is not a provisional response but a final response.

The SSL VPN server information includes various settings such as a selected encryption type and presence/absence of data compression, and parameters of the data communication such as an IP address and a port number waiting for the SSL VPN connection from the communication apparatus 101a. In the case illustrated in FIG. 11A, the communication apparatus 101b replies the SDP including "encryption type is AES, key length is 128 bit, data compression is valid, its own IP address, port number 11111, server". Its own IP address is an IP address for getting access to the communication apparatus 101b, in other words, is an IP address of the communication apparatus 101b, or an external IP address of a router when the data communication is performed via a router.

In step S103, the communication apparatus 101b, after transmitting a provisional response, transmits a final response 200 response. The 200 response may include the same SDP as an SDP included in the provisional response. Further, reliability of the provisional response may be secured by a Provisional Response ACK (PRACK) request between the provisional response and the final response, but the PRACK request is omitted in FIG. 4.

In step S104, the communication apparatus 101a which has received the final response transmits an ACK message to the communication apparatus 101b. In step S105, the communication apparatus 101a performs SSL VPN connection to the communication apparatus 101b based on the SSL VPN server information of the communication apparatus 101b described in the SDP included in the provisional response (18x) or the final response (200OK). In FIG. 4, after transmitting and receiving the ACK message in step S104, connection of the SSL VPN is established in step S105. Alternatively, after receiving the provisional response in step S102, or after the final response in step S103, connection of the SSL VPN may be established in step S105.

As described above, the communication apparatus 101b can establish the SSL VPN connection without unnecessary SSL VPN server information being known by the communication apparatus 101a. More specifically, the communication apparatus 101b notifies the communication apparatus 101a of only the SSL VPN server information to be used in the data communication. As a result, the SSL VPN connection can be established without other pieces of the SSL VPN server information which are not used in the data communication being known. In the case illustrated in FIG. 11A, the communication apparatus 101b notifies only the SSL VPN server information about AES-128, so that existence of the SSL VPN server information about DES-128 is never known by the communication apparatus 101a.

Next, a case where the communication apparatus 101a which makes a connection request to the communication apparatus 101b becomes a server (server apparatus) of the SSL VPN will be described with reference to FIG. 5.

In step S201, the communication apparatus 101a transmits an INVITE message as a start request of the data communication to the communication apparatus 101b according to a connection instruction from the user.

In step S202, the communication apparatus 101b which has received the INVITE message transmits a provisional response including the SDP added with at least one or more pieces of the SSL VPN client information to the communication apparatus 101a, and offers the SSL VPN connection. The SSL VPN client information is a type of the SSL VPN client supported by the communication apparatus 101b. In the case illustrated in FIG. 11B, the SSL VPN client information is an SDP including parameters of the data communication which is performed by a client of "encryption type is AES, key length is 128 bit, data compression is disabled, client", or "encryption type is DES, key length is 256 bit, data compression is disabled, client".

In step S203, the communication apparatus 101a which has received the provisional response selects a piece of the SSL VPN client information to be used in the data communication from a plurality of pieces of the SSL VPN client information, and transmits the PRACK including the SDP added with corresponding SSL VPN server information. In the case illustrated in FIG. 11B, the SSL VPN client information is an SDP including parameters of the data communication which is performed by a server of "encryption type is DES, key length is 256 bit, data compression is disabled, its own IP address, port number 33333, server". The communication apparatus 101a may transmit the PRACK message without including the SDP, or may transmit the PRACK message added with the SDP according to an UPDATE request.

In step S204, the communication apparatus 101b which has received the PRACK transmits a response to the PRACK message. In step S205, the communication apparatus 101b transmits a final response to the INVITE message. In step S206, the communication apparatus 101a which has received the final response transmits the ACK message to the communication apparatus 101b.

In step S207, the communication apparatus 101b which has received the ACK message performs SSL VPN connection to the communication apparatus 101a based on the SSL VPN server information included in the SDP of the PRACK message.

As described above, the communication apparatus 101b can establish the SSL VPN connection without the SSL VPN server information being known by the communication apparatus 101a. Moreover, the communication apparatus 101a notifies the communication apparatus 101b of only the SSL VPN server information to be used in data communication. As a result, the SSL VPN connection can be established without other pieces of the SSL VPN server information which are not used in the data communication being known.

Next, a case where the communication apparatus 101b which received the connection request from the communication apparatus 101a does not support the SSL VPN server corresponding to the SSL VPN client information offered by the communication apparatus 101a will be described below with reference to FIG. 6.

The processing in step S301 is similar to that in step S101. In the case illustrated in FIG. 11C, the SSL VPN client information is the SDP including "encryption type is DES, key length is 256 bit, data compression is disabled, client".

The communication apparatus 101b which has received an INVITE message analyzes an SDP included in the INVITE message, and acquires the SSL VPN client information. However, if the communication apparatus 101b determines that it does not support a SSL VPN server corresponding to the acquired SSL VPN client information, then in step S302, transmits a 183 provisional response including the SDP added with at least one or more pieces of the SSL VPN client information. Consequently, the SSL VPN connection can be offered again.

FIG. 11C illustrates a case where the communication apparatus 101b does not support the SSL VPN server which can correspond to the received client information, "encryption type is DES, key length is 256 bit, data compression is disabled, client". In this case, the SPD transmitted in step S302 becomes an SDP including "encryption type is DES, key length is 256 bit, data compression is disabled, client", and "encryption type is AES, key length is 128 bit, data compression is disabled, client", as the SSL VPN client information to which the communication apparatus 101b corresponds.

If the communication apparatus 101a which has received the provisional response determines that the SSL VPN client information is included in the provisional response instead of the SSL VPN server information, then in step S303, the communication apparatus 101a transmits the PRACK. Further, in step S305, the communication apparatus 101a selects a piece of the SSL VPN client information to be used in the SSL VPN from among a plurality of pieces of the SSL VPN client information, and transmits an UPDATE request including the SDP added with the corresponding SSL VPN server information. Consequently, the communication apparatus 101a makes a response to the SSL VPN connection.

In the case illustrated in FIG. 11C, the communication apparatus 101a answers with the SDP including "encryption type is DES, key length is 256 bit, data compression is disabled, its own IP address, port number 3333, server". The communication apparatus 101a may transmit the PRACK including the SDP, instead of the UPDATE.

In step S304, the communication apparatus 101b which has received the PRACK makes a response to the PRACK. In step S306, the communication apparatus 101b which has received the UPDATE transmits the response to the UPDATE to the communication apparatus 101a.

In step S307, the communication apparatus 101a which has received the response to the UPDATE, transmits an ACK message to the communication apparatus 101b. In step S308, the communication apparatus 101b which has received the ACK message establishes the SSL VPN connection to the communication apparatus 101a based on the SSL VPN server information included in the SDP of the UPDATE message.

As described above, the communication apparatus 101b can establish the SSL VPN connection without the SSL VPN server information being known by the communication apparatus 101a. Moreover, the communication apparatus 101a notifies the communication apparatus 101b of only the SSL VPN server information and the SSL VPN client information to be used in the data communication. As a result, the SSL VPN connection can be established without other pieces of the SSL VPN server information which are not used in the data communication being known.

Figure 7A:
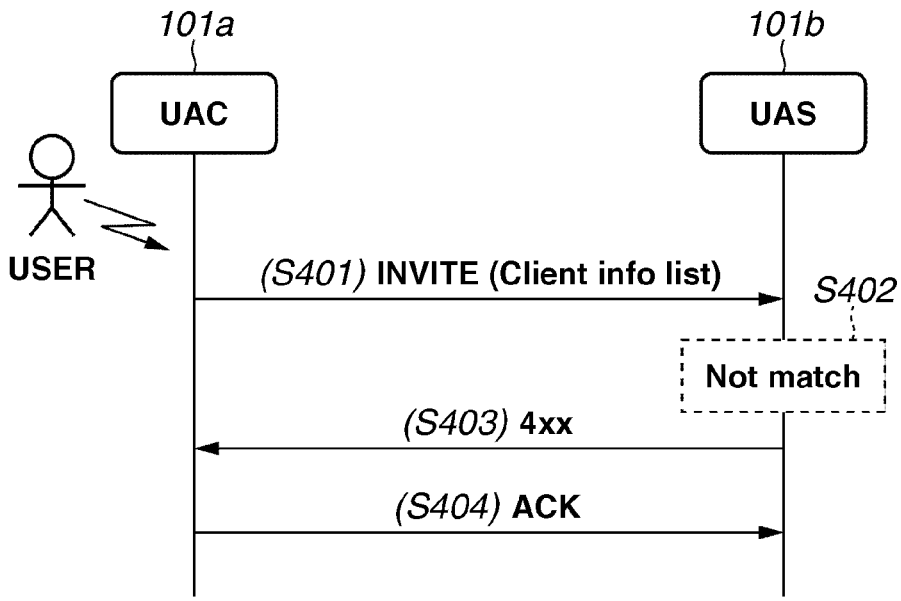
FIGS. 7A and 7B illustrate procedures in a case where the SSL VPN connection is disabled, regarding the data communication start procedures.
Figure 7B:
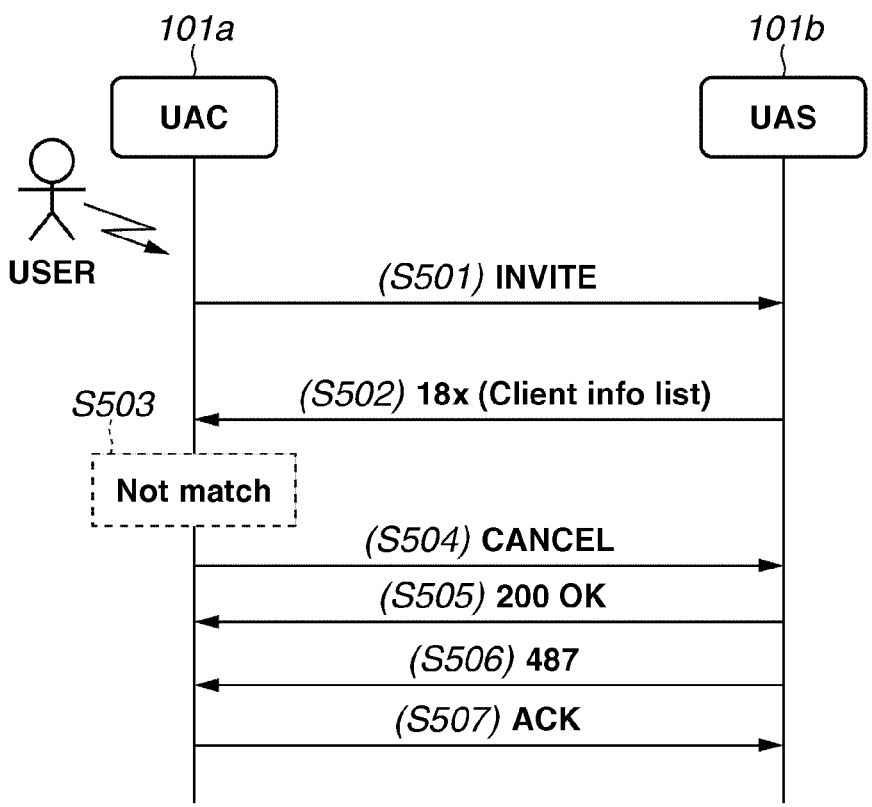

Next, data communication start procedures in the present exemplary embodiment will be described with reference to FIGS. 7A and 7B, with taking a procedure when the SSL VPN connection is disabled as an example.

It is assumed that the communication apparatus 101a is an SIP user agent client (UAC), and the communication apparatus 101b is an SIP user agent server (UAS). The UAC (the communication apparatus 101a) makes the connection request to the UAS (the communication apparatus 101b) by the user inputting the SIP uniform resource identifier (SIP-URI) indicating the communication apparatus 101b. In FIGS. 7A and 7B, the UAC and the UAS directly perform data communication with each other. However, communication of the SIP message may be performed by being relayed by an SIP server, or other apparatus located between the UAC and the UAS.

A case where the data communication cannot be performed because the communication apparatus 101b does not support the SSL VPN server corresponding to the SSL VPN client information which the communication apparatus 101a has offered will be described with reference to FIG. 7A.

The processing in step S401 is similar to that in step S101. The communication apparatus 101b which has received an INVITE message analyzes an SDP included in the INVITE message, and acquires the SSL VPN client information. If the communication apparatus 101b does not support the SSL VPN server corresponding to the acquired SSL VPN client information, and does not support the SSL VPN client function, then in step S402, the communication apparatus 101b determines that communication is disabled.

In step S403, the communication apparatus 101b which has determined that communication is disabled transmits an error response (4xx) to the communication apparatus 101a. In step S404, the communication apparatus 101a which has received the error response transmits an ACK, performs termination processing of a session based on the SIP protocol, and informs the user that the data communication cannot be performed.

Next, a case where the data communication cannot be performed because the communication apparatus 101a does not support the SSL VPN server corresponding to the SSL VPN client information which the communication apparatus 101b has offered, will be described with reference to FIG. 7B.

The processing in step S501 and S502 are similar to those in steps S201 and S202. In step S503, when the communication apparatus 101a does not support the SSL VPN server corresponding to the SSL VPN client offered by the communication apparatus 101b and does not support the SSL VPN client, the communication apparatus 101a which has received the provisional response determines that communication is disabled.

In step S504, the communication apparatus 101a which has determined that the communication is disabled makes a request for canceling halfway through a session establishment request based on the specification of the SIP protocol. In step S505, the communication apparatus 101b which has received the cancellation request makes a response to the fact that the request has been accepted, and in step S506, transmits a response that the session establishment has been canceled to the communication apparatus 101a. In step S507, the communication apparatus 101a which has received the response transmits the ACK. Moreover, the communication apparatus 101a notifies that data communication with the communication apparatus 101b has been disabled.

Next, a case where data communication cannot be performed because both of the communication apparatus 101a and the communication apparatus 101b do not support the SSL VPN server corresponding to the SSL VPN client information which the both have offered, will be described with reference to FIG. 7B. In this case, insteps S501 and S502, the similar processing to those in step S301 and S302 are executed. Further, in steps S503 to S507, the processing as described above are performed.

Next, referring to FIGS. 8A to 8C, and FIGS. 9A and 9B, a flow of the data communication start processing in the data communication via the SSL VPN will be described. It is assumed that the communication apparatus 101a is an SIP user agent client (UAC), and the communication apparatus 101b is an SIP user agent server (UAS).

Figure 8A:
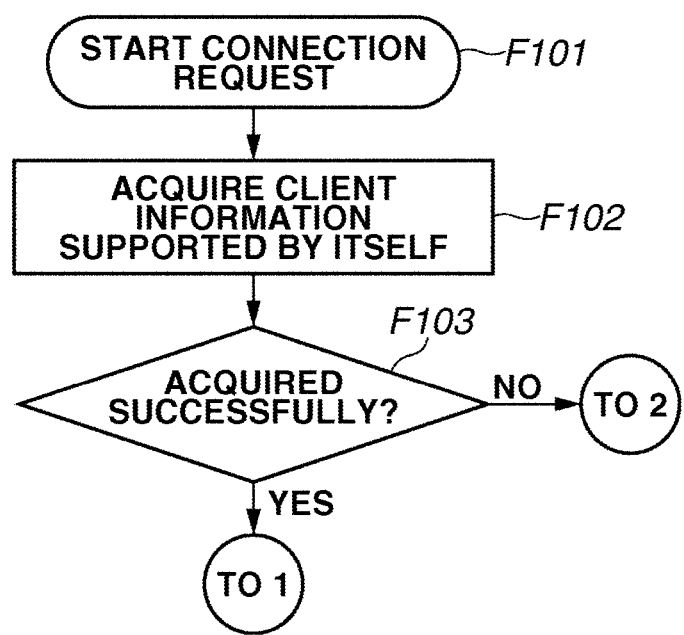
Figure 8C:
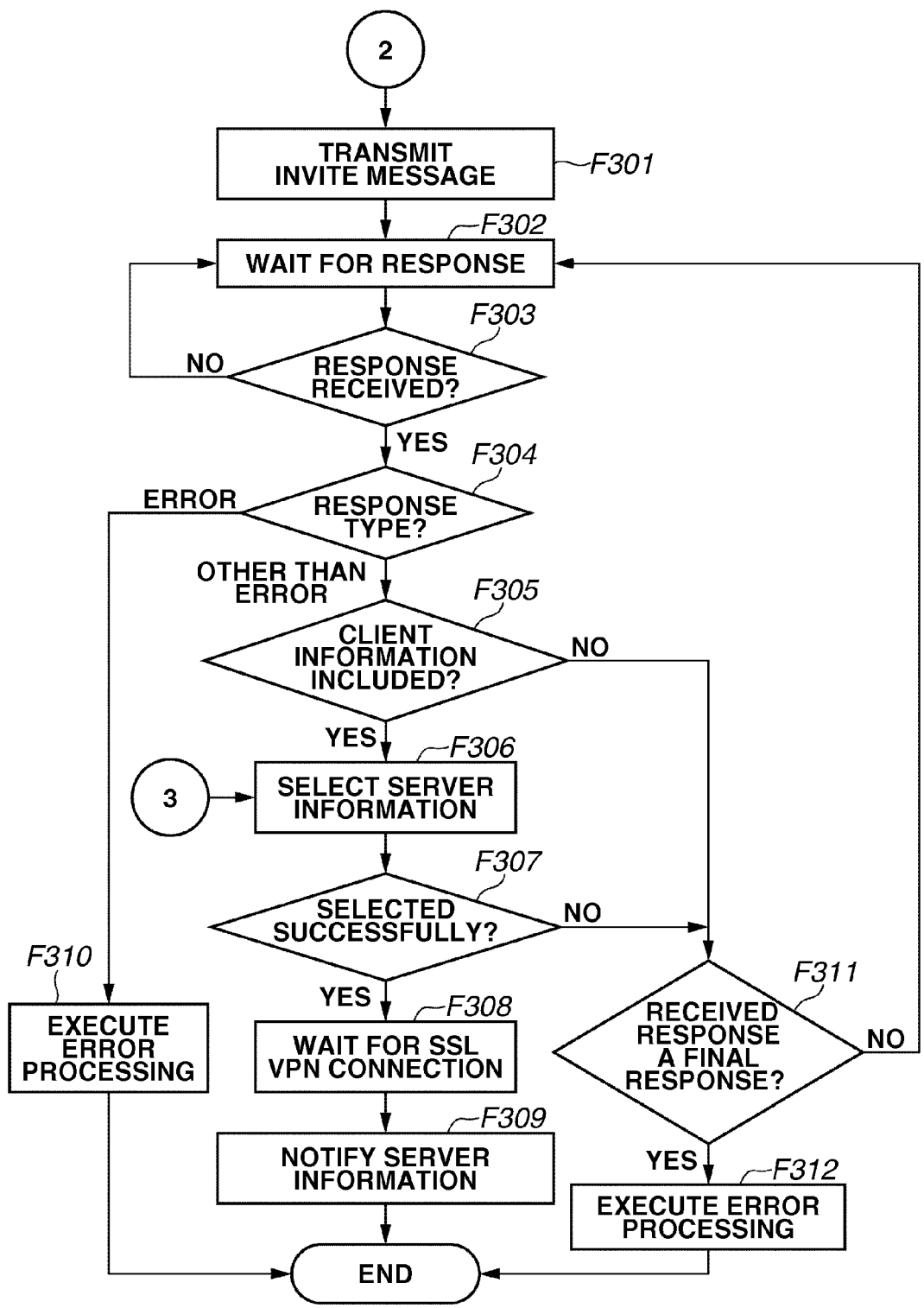

A flow of processing executed by of the UAC (the communication apparatus 101a) will be described with reference to FIGS. 8A to 8C. In step F101 in FIG. 8A, the communication apparatus 101a starts a connection request to the UAS (the communication apparatus 101b upon receiving the SIP-URI indicating the communication apparatus 101b input by the user.

In step F102, upon starting the connection request, the communication apparatus 101a attempts to acquire information about the SSL VPN client (SSL VPN client information) supported by itself. In step F103, the communication apparatus 101a determines whether the SSL VPN client information has been acquired successfully. In step F103, it is determined whether the SSL VPN client information is included in the connection information 321.

If the SSL VPN client information has been acquired successfully (YES in step F103), the communication apparatus 101a creates an INVITE message including the SDP added with the SSL VPN client information. In step F201, the communication apparatus 101a transmits the INVITE message to the communication apparatus 101b. Then in step F202, the communication apparatus 101a waits for a response to the INVITE message from the communication apparatus 101b.

In step F203, if the response is received from the communication apparatus 101b (YES in step F203), then in step F204, the communication apparatus 101a determines whether the response is an error. If the response is the error (4xx) (ERROR in step F204), then in step F210, the communication apparatus 101a executes error processing. The error processing includes release of resources secured when the connection processing has been executed, termination processing of the session in accordance with the SIP protocol, and notification of connection failure to the user.

On the other hand, if the received response is not an error as a result of determination in F204 (OTHER THAN ERROR in step F204), then in step F205, the communication apparatus 101a determines whether the SSL VPN server information is added to the SDP included in the received response (18x). If the SSL VPN server information is included therein (YES in step F205), then in step F206, the communication apparatus 101a executes SSL VPN connection processing (step S105) to an IP address and a port number included in the SSL VPN server information.

On the other hand, if the SSL VPN server information is not included in the received response message as a result of determination in F205 (NO in step F205), then in step F207, the communication apparatus 101a determine whether the SSL VPN client information is included therein. If the SSL VPN client information is not included therein (NO in step F207), then in step F208, the communication apparatus 101a determines whether the received response is a final response or a provisional response. If the received response is the provisional response (NO in step F208), then in step F202, the processing returns to a response wait state. On the other hand, if the received response is the final response (YES in step F208), then in step F209, the communication apparatus 101a executes the error processing. The error processing includes release of resources secured when the connection processing has been executed, termination processing of the session in accordance with the SIP protocol, and notification of connection failure to the user.

If the SSL VPN client information is included in the received response message (YES in step F207), then in step F306, the communication apparatus 101a selects the SSL VPN server information described below.

On the other hand, in step F103, if the SSL VPN client information has not been acquired successfully (NO in step in F103), then in step F301, the communication apparatus 101a transmits an INVITE message which does not include the SSL VPN client information to the communication apparatus 101b. Then, in step F302, the communication apparatus 101a waits for a response to the INVITE message from the communication apparatus 101b.

In step F303, if the response from the communication apparatus 101b has been received (YES in step F303), then in step F304, the communication apparatus 101a determines whether the response is an error. If the response is an error (ERROR in step F304), then in step F310, the communication apparatus 101a executes the error processing. The error processing includes release of resources secured when the connection processing has been executed, termination processing of the session in accordance with the SIP protocol, and notification of connection failure to the user.

On the other hand, if the received response is not an error (OTHER THAN ERROR in step F304), then in step F305, the communication apparatus 101a determines whether the SSL VPN client information is added to the SDP included in the received response message.

If the SSL VPN client information is not included therein (NO in step F305), then in step F311, the communication apparatus 101a determines whether the received response is a final response or a provisional response. If the received response is the provisional response (NO in step F311), then in step F302, the communication apparatus 101a returns to the response wait state. If the received response is the final response (YES in step F311), then in step F312, the communication apparatus 101a executes the error processing. The error processing includes release of resources secured when the connection processing has been executed, termination processing of the session in accordance with the SIP protocol, and notification of connection failure to the user.

If the SSL VPN client information is included in the received response message (18x) (YES in step F305), then in step F306, the communication apparatus 101a attempts to select SSL VPN server information corresponding to the SSL VPN client information from the SSL VPN server information supported by itself. In step F307, the communication apparatus 101a determines whether the SSL VPN server information has been selected successfully. The SSL VPN server information supported by itself is stored in the connection information 321. If the communication apparatus 101a does not support the SSL VPN server corresponding to the SSL VPN client, the communication apparatus 101a executes the processing in F311 and afterward described above. However, if the above described determination from step F207 to step F307 is made, the processing returns to the response wait state in step F202.

If the communication apparatus 101a supports the SSL VPN server corresponding to the SSL VPN client information as a result of determination in F307 (YES in step F307), then in step F308, the communication apparatus 101a performs waiting preparation of the SSL VPN server, and waits for the SSL VPN connection (in steps S207 and S308) from the communication apparatus 101b. In step F309, the communication apparatus 101a adds the IP address and the port number to the PRACK message (step S203) of the SIP or the SDP of the UPDATE message (step S305) as a type of the SSL VPN server to be used and waiting information of the SSL VPN server and transmits the PRACK message or UPDATE message to the communication apparatus 101b.

Figure 9A:
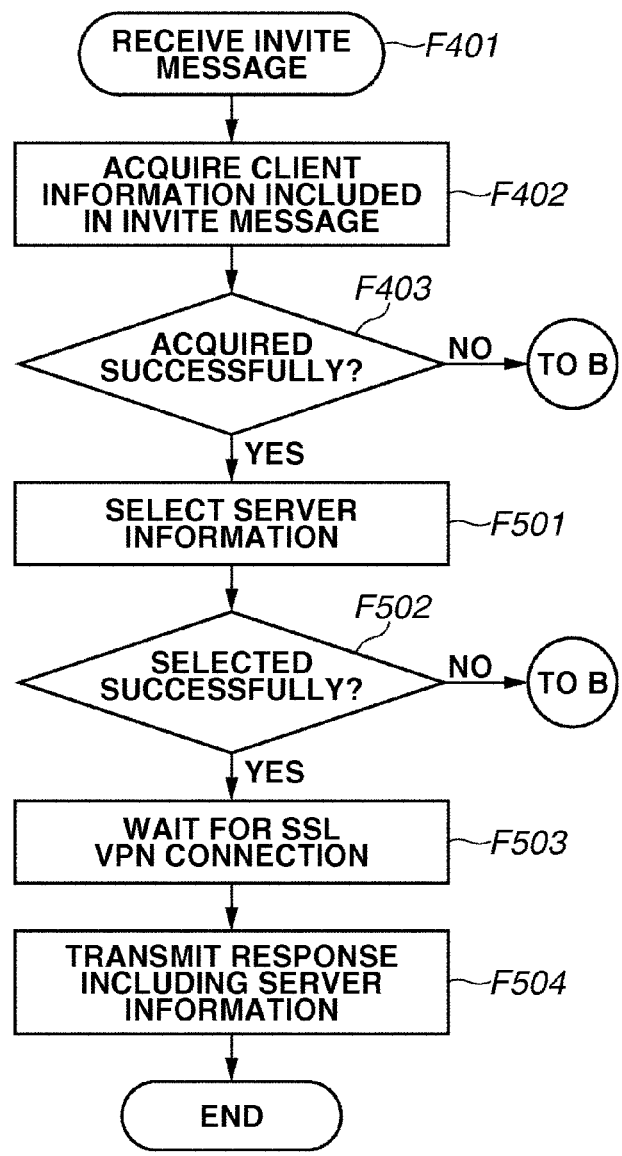
FIGS. 9A and 9B are flowcharts illustrating data communication start processing in case of data communication by the SSL VPN.
Figure 9B:
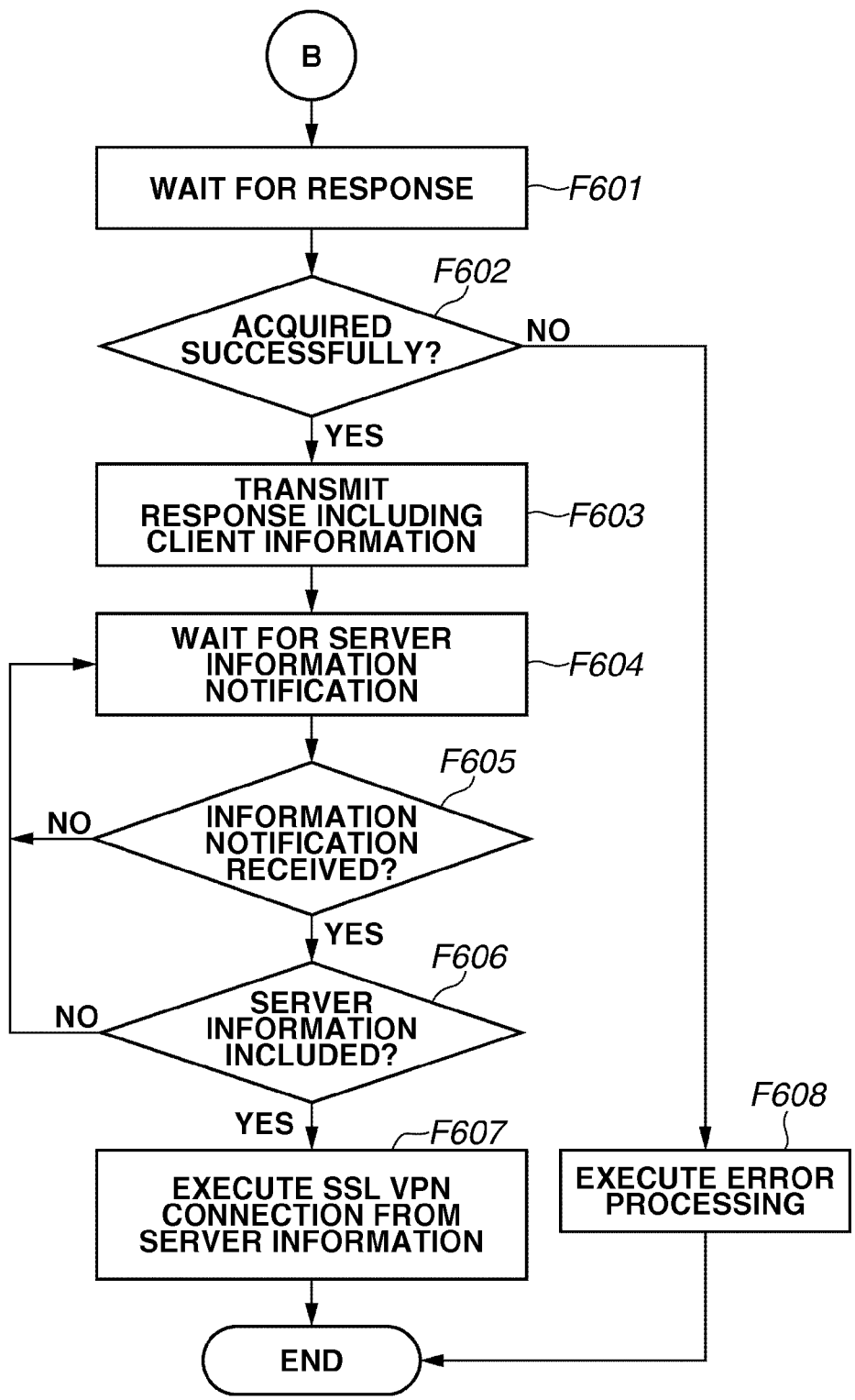

Next, a flow of processing executed by the UAS (the communication apparatus 101b) will be described with reference to FIG. 9A and FIG. 9B. In step F401, the communication apparatus 101b starts SSL VPN connection processing upon receiving the INVITE message as a start request of the data communication from the communication apparatus 101a.

In step F402, the communication apparatus 101b attempts to acquire the SSL VPN client information added to the SDP of the received INVITE message. In step F403, it is determined whether the SSL VPN client information has been acquired successfully.

If the SSL VPN client information, i.e., information about parameters of the data communication performed by the client is added (YES in step F403), then in step F501, the communication apparatus 101b attempts to select a corresponding SSL VPN server. The SSL VPN server information is stored in the connection information 321. If the corresponding SSL VPN server is not supported (NO in step F502), the communication apparatus 101b executes the processing in F601 and afterward described below.

On the other hand, if the corresponding SSL VPN server is supported as a result of determination in F502 (YES in step F502), then in step F503, the communication apparatus 101b executes processing for waiting for the SSL VPN connection (in step S105) from the communication apparatus 101a to the SSL VPN server. Then, in step F504, the communication apparatus 101b transmits a response (18x) including a type of the selected SSL VPN server and the SDP added with waiting information about the SSL VPN server to the communication apparatus 101a. The response is a provisional response (18x) or a final response (200OK) of the SIP. In case of the provisional response, the final response is transmitted after that.

On the other hand, if the SSL VPN client information is not included in the received INVITE message (NO in step F403), then in step F601, the communication apparatus 101b attempts to acquire the SSL VPN client information which is supported by the communication apparatus 101b itself. The SSL VPN client information supported by itself is stored in the connection information 321. If the SSL VPN client information has not been acquired successfully (NO in step F602), then in step F608, the communication apparatus 101b executes the error processing. The error processing includes release of resources secured when the connection processing has been executed, and termination processing of the session in accordance with the SIP protocol.

On the other hand, in step F602, if the SSL VPN client information has bee acquired successfully as a result of determination (YES in step F602), then in step F603, the communication apparatus 101b transmits the provisional response (18x) of the SIP including the SDP added with the SSL VPN client information to the communication apparatus 101a.

After transmitting the provisional response, in step F604, the communication apparatus 101*b* waits for reception of a PRACK message or an UPDATE message as a server information notification waiting from the communication apparatus 101*a*.

If the PRACK message or the UPDATE message is received (YES in step F605), then in step F606, the communication apparatus 101*b* determines whether the SSL VPN server information as information about parameters of the data communication performed by the server is included in the message. If the PRACK message or the UPDATE message including the SSL VPN server is not received and a predetermined time period has elapsed, then in step F608, the communication apparatus 101*b* executes the error processing.

On the other hand, if the PRACK message or the UPDATE message including the SSL VPN server information is received (YES in step F606), then in step F607, the communication apparatus 101*b* executes connection processing to the SSL VPN server (in steps S207 and S308) according to a server type, an IP address, and a port number included in the SSL VPN server information.

FIG. 10A illustrates an example of the SDP including the SSL VPN client information. The SDP includes an IP address 400 of the SSL VPN client, and pieces of the SSL VPN client information 410 and 420. The SSL VPN client information 410 includes information about a transmission port 411, an encryption type 412, and an SSL VPN client 413. The information 420 includes information about a transmission port 421, an encryption type 422, and an SSL VPN client 423. The encryption type 412 to be used indicates encryption type AES, key length 128 bit, and ZLIB-compatible (ZLIB compression can be performed). The character string described here is merely an example, and other character strings may be used. The encryption type 422 to be used indicates encryption type DES, key length 256 bit, and ZLIB-compatible. The character string described here is merely an example, and other character strings may be used.

Next, an example of the SDP including the SSL VPN server information will be described with reference to FIG. 10B. The SDP includes an IP address 500 to wait for the SSL VPN server, a port 501 to wait for the SSL VPN server, and server information 502. The SDP further includes an encryption type 503 to be used which indicates encryption type AES, key length 128 bit, and ZLIB-compatible. The character string described here is merely an example, and other character strings may be used.

If a plurality of pieces of the SSL VPN client information is offered and there is a plurality of corresponding SSL VPN servers, a priority table for selecting a SSL VPN server is created as follows, for example. A first priority is given to the encryption type. The AES has precedence over the DES. A second priority is given to the key length. A longer key length has precedence. A third priority is given to presence or absence of data compression. A presence of data compression has precedence over absence thereof. The priority may be determined based on not only use of the table, but also other methods such as order of the SSL VPN client information described in the SDP.

A suitable SSL VPN connection is made possible by changing priority according to a processing load on the communication apparatus imposed by the encryption type and the key length or a load on the communication apparatus imposed by data compression and a data transfer speed.

In the present exemplary embodiment, although negotiations have been made about the encryption type of the SSL VPN, the present invention can be also adapted to a case where negotiation of communication protocol is determined. The present invention can be also adapted to a case where a negotiation is made about which protocol is to be used among protocols such as, for example, a TLS, a DTLS, a sound exchange (SOX).

Aspects of the present invention can also be realized by a computer of a system or apparatus (or devices such as a CPU or MPU) that reads out and executes a program recorded on a computer-readable storage medium to perform the functions of the above described embodiment(s), and by a method, the steps of which are performed by a computer of a system or apparatus by, for example, reading out and executing a program recorded on a memory device to perform the functions of the above described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-179811 filed Jul. 31, 2009, which is hereby incorporated by reference herein in its entirety.

What is claimed is:

1. A communication apparatus configured to act as both a client and a server for different respective communication sessions based on negotiated parameters, comprising:

a reception unit configured to receive a communication request from a communication partner, the communication request including a proposed parameter to be used by the communication partner in a communication session between the communication apparatus and the communication partner, a determination unit configured to:

determine, for the proposed parameter included in the communication request, whether the communication apparatus supports a first parameter which is used by the communication apparatus functioning as a server and is corresponding to the proposed parameter used by the communication partner functioning as a client;

determine based on a determination that the communication apparatus supports the first parameter corresponding to the proposed parameter used by the communication partner functioning as a client, that the communication apparatus is to function as a server for the communication session; and determine based on a determination that the communication apparatus does not support the first parameter corresponding to the proposed parameter used by the communication partner functioning as a client, that the communication apparatus is to function as a client for the communication session; and a transmission unit configured to:

based on a determination that the communication apparatus is to function as the server for the communication session, transmit to the communication partner, a response including the first parameter supported by the communication apparatus to accept the proposed parameter; and based on a determination that the communication apparatus is to function as the client for the communication session, transmit to the communication partner a response including a new first parameter supported by the communication apparatus functioning as a client to propose to use instead of the first parameter for the communication session, wherein the response does not include all possible parameters of the communication apparatus for the communication session to prevent the communication partner from knowing all of the possible parameters of the communication apparatus.

2. The communication apparatus according to claim 1, further comprising a connection unit configured, when the response including the new first parameter used by the communication apparatus functioning as the client is transmitted by the transmission unit and a second parameter used by the communication partner functioning as the server is received by the reception unit in response to the response including the new first parameter used by the communication apparatus functioning as the client, to connect to the communication partner based on the new first parameter.

3. The communication apparatus according to claim 1, wherein the proposed, the first, and the new first parameters include types of communication protocols.

4. The communication apparatus according to claim 1, wherein the first parameter includes a port number.

5. The communication apparatus according to claim 1, wherein the reception unit receives the communication request in accordance with a session control protocol, and the transmission unit transmits the response in accordance with the session control protocol.

6. The communication apparatus according to claim 1, wherein the transmission unit transmits the response including the new first parameter used by the communication apparatus functioning as the client if a second parameter indicating that the communication partner functions as the client is not included in the communication request received from the communication partner.

7. A method for communication executed in a communication apparatus configured to act as both a client and a server for different respective communication sessions based on negotiated parameters, the method comprising:
  receiving a communication request from a communication partner, the communication request including a proposed parameter to be used by the communication partner in a communication session between the communication apparatus and the communication partner,
  determining, for the proposed parameter included in the communication request, whether the communication apparatus supports a first parameter which is used by the communication apparatus functioning as a server and is corresponding to the proposed parameter used by the communication partner functioning as a client;
  determining based on a determination that the communication apparatus supports the first parameter corresponding to the proposed parameter used by the communication partner functioning as a client, that the communication apparatus is to function as a server for the communication session;
  determining based on a determination that the communication apparatus does not support the first parameter corresponding to the proposed parameter used by the communication partner functioning as a client, that the communication apparatus is to function as a client for the communication session; and
  based on a determination that the communication apparatus is to function as the server for the communication session, transmitting to the communication partner a response including the first parameter supported by the communication apparatus to accept the proposed parameter; and based on a determination that the communication apparatus is to function as the client for the communication session,
  transmitting to the communication partner a response including a new first parameter supported by the communication apparatus functioning as a client to propose to use instead of the first parameter for the communication session, wherein the response does not include all possible parameters of the communication apparatus for the communication session to prevent the communication partner from knowing all of the possible parameters of the communication apparatus.

8. The method according to claim 7, further comprising:
  if the response including the new first parameter used by the communication apparatus functioning as the client is transmitted, and a second parameter used by the communication partner functioning as the server is received from the communication partner in response to the response including the new first parameter used by the communication apparatus functioning as the client, connecting to the communication partner based on the new first parameter.

9. The method according to claim 7, wherein
  the communication request is received in accordance with a session control protocol, and
  the response is transmitted in accordance with the session control protocol.

10. A non-transitory computer-readable storage medium storing a computer-executable process to be performed by the communication apparatus configured to act as both a client and a server for different respective communication sessions based on negotiated parameters, the computer-executable process causing a computer to perform a method comprising:
  receiving a communication request from a communication partner, the communication request including a proposed parameter to be used by the communication partner in a communication session between the communication apparatus and the communication partner,
  determining, for the proposed parameter included in the communication request, whether the communication apparatus supports a first parameter which is used by the communication apparatus functioning as a server and is corresponding to the proposed parameter used by the communication partner functioning as a client;
  determining based on a determination that the communication apparatus supports the first parameter corresponding to the proposed parameter used by the communication partner functioning as a client, that the communication apparatus is to function as a server for the communication session;
  determining based on a determination that the communication apparatus does not support the first parameter corresponding to the proposed parameter used by the communication partner functioning as a client, that the communication apparatus is to function as a client for the communication session;
  based on a determination that the communication apparatus is to function as the server for the communication session,
    transmitting to the communication partner a response including the first parameter supported by the communication apparatus to accept the proposed parameter; and
  based on a determination that the communication apparatus is to function as the client for the communication session, transmitting to the communication partner a response including a new first parameter supported by the communication apparatus functioning as a client to propose to use instead of the first parameter for the communication session, wherein the response does not include all possible parameters of the communication partner for the communication session to prevent the communication partner from knowing all of the possible parameters of the communication apparatus.

11. The computer-readable storage medium according to claim 10 further comprising:
if the communication apparatus functions as the client, and the communication apparatus receives a second parameter to function as the server in response to the response including the new first parameter used by the communication apparatus functioning as the client, connecting to the communication partner based on the first parameter.

12. The computer-readable storage medium according to claim 10, wherein
the communication request is received in accordance with a session control protocol; and
the response is transmitted in accordance with the session control protocol.

* * * * *